United States Patent [19]

I-Shin

[11] Patent Number: 5,315,735
[45] Date of Patent: May 31, 1994

[54] OPPOSED ROLLER-TYPE MOTOR VEHICLE WINDSHIELD WIPER

[76] Inventor: Chiu I-Shin, F. 10, No. 86, Sec. 1, Hsin Hai Road, Taipei, Taiwan

[21] Appl. No.: 991,023
[22] Filed: Dec. 15, 1992
[51] Int. Cl.⁵ .............................. B60S 1/44; B60S 1/20
[52] U.S. Cl. .............................. 15/250.22; 15/250.24; 15/250.29; 15/250.12; 15/103; 74/37; 318/DIG. 2; 15/250.17
[58] Field of Search .......... 15/250.22, 250.24, 250.25, 15/250.29, 250.14, 250.27, 250.16, 250.17, 250.12, 77, 98, 103, 49.1; 318/DIG. 2; 74/37

[56] References Cited

U.S. PATENT DOCUMENTS

| | | | |
|---|---|---|---|
| 950,991 | 3/1910 | Brown | 15/250.22 |
| 1,766,550 | 6/1930 | Schubert | 15/250.24 |
| 2,206,006 | 6/1940 | Hendrey | 15/250.29 |
| 2,648,087 | 8/1953 | Kiker | 15/250.22 |
| 2,847,859 | 8/1958 | Lynott | 74/37 |
| 3,887,955 | 6/1975 | Jarvinen | 15/250.24 |

Primary Examiner—Harvey C. Hornsby
Assistant Examiner—Gary K. Graham
Attorney, Agent, or Firm—Lowe, Price, LeBlanc & Becker

[57] ABSTRACT

A motor vehicle windshield wiper is disclosed having two spaced wiping rollers bilaterally attached to a windshield and reciprocated by a belt drive assembly over the windshield between a transverse top rail and a transverse bottom rack by means of the control of two opposite limit switches and two opposite electromagnetic switches.

1 Claim, 4 Drawing Sheets

OPPOSED ROLLER-TYPE MOTOR VEHICLE WINDSHIELD WIPER

BACKGROUND OF THE INVENTION

The present invention relates to a motor vehicle windshield wiper which uses a belt drive assembly to reciprocate two spaced wiping rollers over a windshield between a transverse top rail and a transverse bottom rack.

The windshield of a motor vehicle is commonly attached with one pair of windshield wipers and reciprocated to maintain clarity of vision by wiping off rain, snow, etc. An ordinary motor vehicle windshield wiper is generally consisted of a squeegee connected to a mechanical arm attached to a wind shield and driven by a reciprocating mechanism to oscillate over a windshield in wiping off rain, snow, etc. Because the two windshield wipers of a motor vehicle are respectively driven to oscillate over the windshield of the motor vehicle, they can only clean part (approximately 70% to 80%) of the windshield, i.e. part of the windshield remain unclean. When the windshield wipers of a motor vehicle do not work, they are transversely disposed on the windshield at the bottom, thereby making the motor vehicle not graceful in appearance. Furthermore, a windshield wiper of this type shall be replaced if the rubber blade of the squeegee is partly damaged.

SUMMARY OF THE INVENTION

The present invention eliminates the aforesaid disadvantages. It is therefore an object of the present invention to provide a motor vehicle windshield wiper which uses two wiping rollers to effectively clean at least 95% of the windshield of a motor vehicle. It is another object of the present invention to provide a motor vehicle windshield wiper which can be conveniently detached from the windshield as it is not in use. It is still another object of the present invention to provide a motor vehicle windshield wiper which is durable in use, and which can still effectively clean a windshield even if either wiping roller is peripherally damaged. It is still another object of the present invention to provide a motor vehicle windshield wiper which is inexpensive to manufacture.

DETAILED DESCRIPTION OF THE PREFERRED EMBODIMENT

Figure 1:
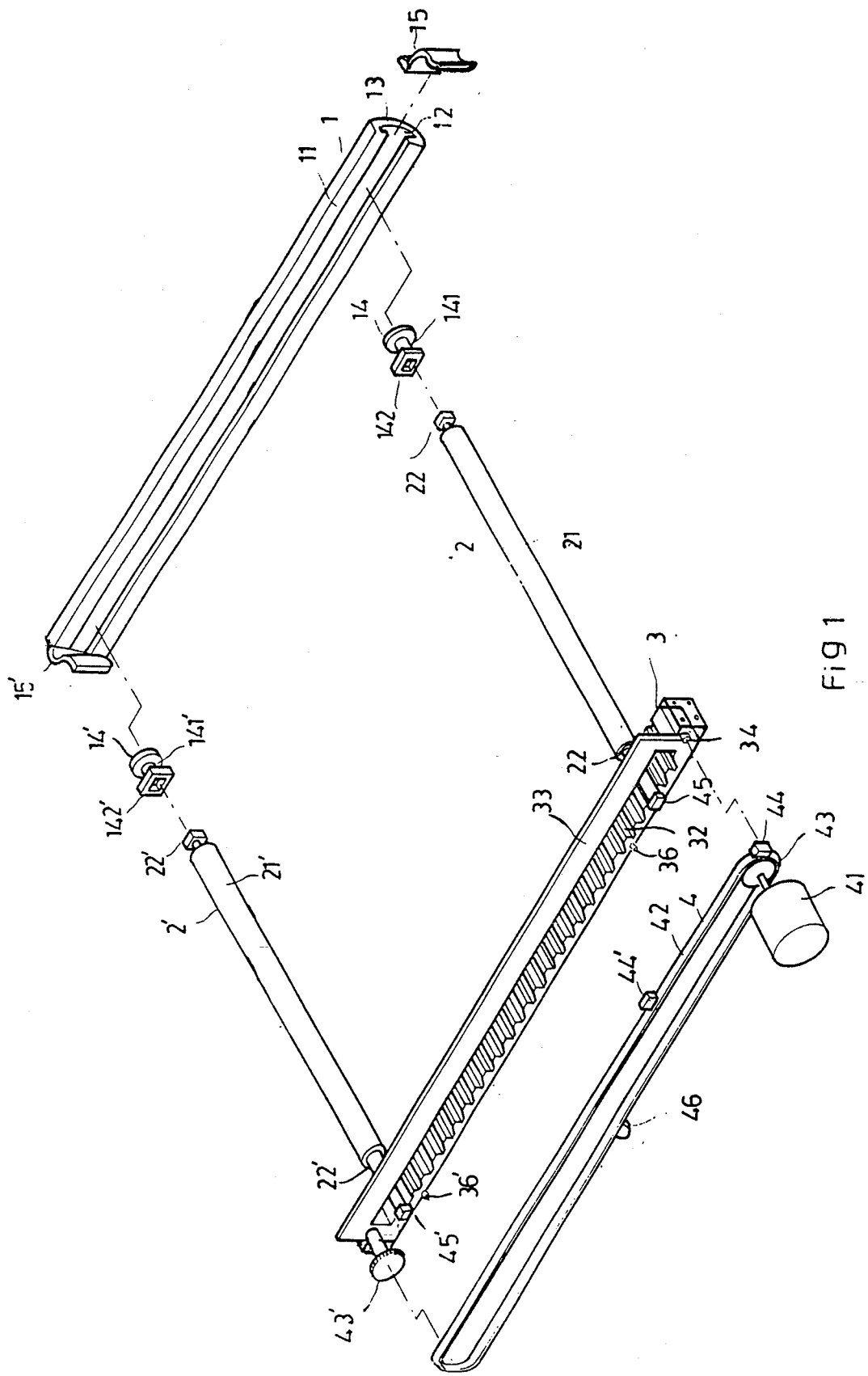
FIG. 1 is an exploded view of a motor vehicle windshield wiper according to the present invention.
Figure 2:
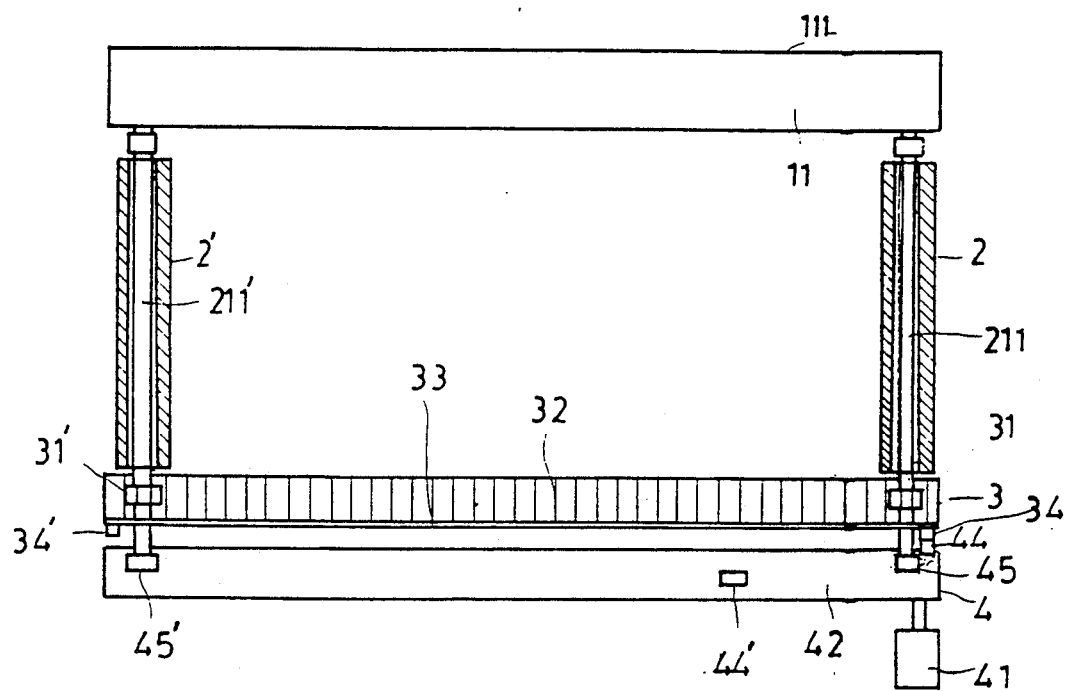
FIG. 2 is a plain view thereof.
Figure 3:
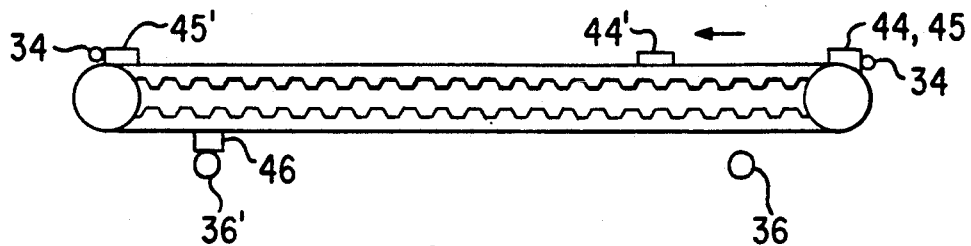
FIGS. 3a–3e illustrates the operation of the belt drive assembly in reciprocating the wiping rollers.
Figure 3:
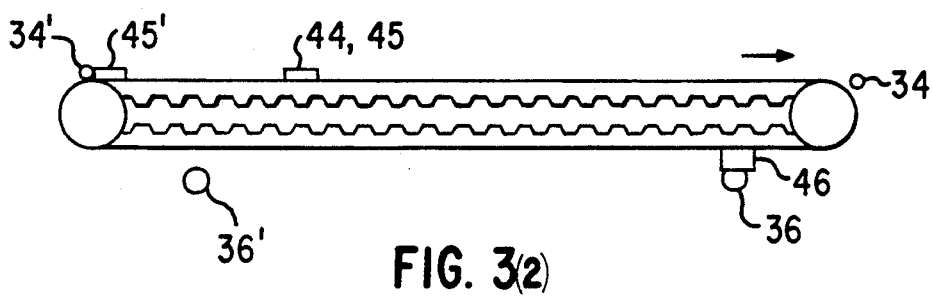
Figure 3:
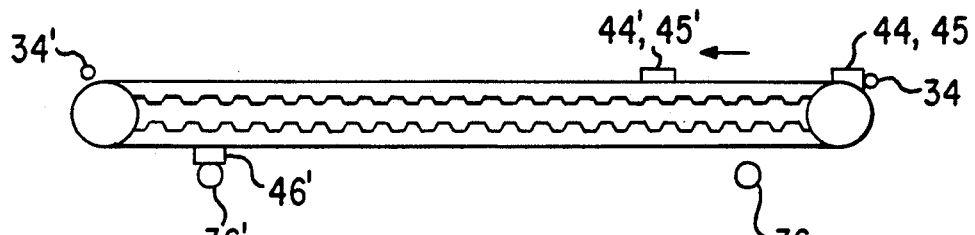
Figure 3:
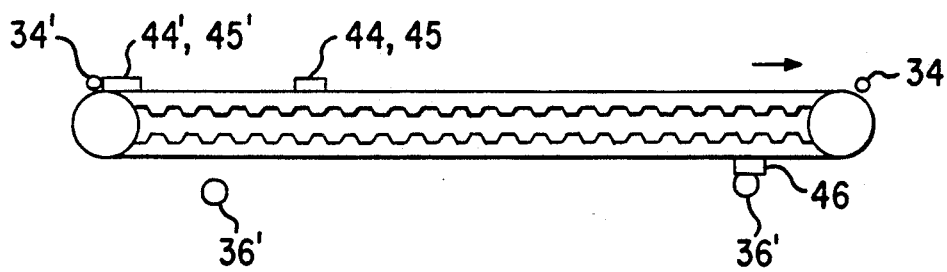
Figure 3:
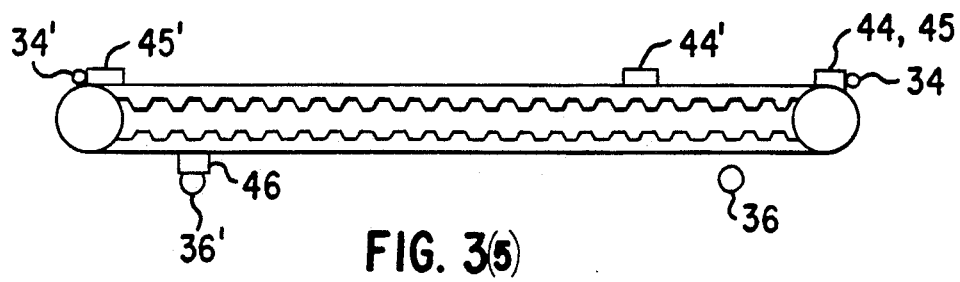

Referring to FIGS. 1, 2 and 3, a windshield wiper as constructed in accordance with the present invention is generally comprised of a transverse top rail 1, two wiping rollers 2,2', a transmission gear assembly 3, and a belt drive assembly 4. The transverse top rail 1 is made in the shape of an elongated, rectangular case 11 having a longitudinal chamber 13 through its length laterally extended to the outside through a narrow, longitudinal groove 12. Two end plates 15,15' are respectively fastened to the two opposite ends of the transverse top rail 1 for mounting on the windshield of a motor vehicle.

Two mobile bearings 14,14' are movably received inside the longitudinal chamber 13. Each mobile bearing 14 or 14' has a stub axle 141 or 141' extended out of the transverse top rail 1 through the longitudinal groove 12 and coupled with a female connector 142 or 142'. The wiping roller 2 or 2' is comprised of a steel axle 22 or 22' inserted through a hollow tube 211 or 211', which is covered with a rubber covering 21 or 21'. A gap is maintained between the steel axle 22 or 22' and the hollow tube 211 or 211', and therefore, the rubber covering 21 or 21' can be rotated with the hollow tube 211 or 211' on the steel axle 22 or 22'. The steel axle 22 or 22' has one end coupled with a first male connector 221 or 221' connected to the female connector 142 or 142' on either mobile bearing 14 or 14', and an opposite end coupled with a second male connector (not shown) connected to a female connector (not shown) on a respective gear 31 or 31' meshed with a rack 32 of the transmission gear assembly 3. An elongated, rectangular frame 33 is fastened to the rack 32 at one side in longitudinal direction to guide the gears 31,31' in mesh with the rack 32 stably and firmly. The belt drive assembly 4 comprises an endless belt 42 mounted around two belt rollers 43,43' driven by a servo motor 41. Two spaced metal push blocks 44,44' and a direction control block 46 are fastened to the endless belt 42 on the outside. Two opposite limit switches 36,36' are fastened to the rack 32 at a lower level at two opposite locations and alternatively triggered by the direction control block 46 to change the revolving direction of the servo motor 41. Two opposite double pole, double throw electromagnetic switches 34,34' are fastened to the rack 32 at an upper level at two opposite locations and alternatively triggered by the push blocks 44,44' to control the operation of two electromagnets 45,45' which are mounted on the two wiping rollers 2,2'. Before start, the right-hand push block 44 is closely attached to the right-hand electromagnetic switch 34 in turning it off, and the direction control block 46 is closely attached to the left-hand limit switch 36'. Once the servo motor 41 was started, the right-hand push block 44 is carried away from the right-hand electromagnetic switch 34 and attracted by the electromagnet 45 on the right-hand wiping roller 2, thereby causing the right-hand wiping roller 2 to be carried leftward. After the right-hand wiping roller 2 has been moved leftward by the right-hand push block 44 a fixed distance, the left-hand push block 44' is attracted by the electromagnet 45' on the left-hand wiping roller 2' while the right-hand limit switch 36 is triggered by the direction control block 46 to change the revolving direction of the servo motor 41, thereby causing the wiping rollers 2,2' to move in the reversed direction until the left-hand limit switch 36' is triggered. Therefore, the wiping rollers 2,2' are alternatively carried back and forth. The installation process of the windshield wiper is easy. The top rail 1 is transversely fastened to the body of the motor vehicle at the top of the windshield with the groove 12 disposed downward, then the transmission gear assembly 3 and the belt drive assembly 4 are fastened to the front end of the motor vehicle inside the engine hood below the windshield, and then the wiping rollers 2,2' are fastened between the top rail 1 and the transmission gear assembly 3. Once the electric circuit of the belt drive assembly 4 has been electrically connected to the motor vehicle's battery power supply, the windshield wiper becomes installed for operation. When installed, the wiping rollers 2,2' are respectively and vertically disposed at two opposite sides on the windshield. Once the servo motor 41 was started, the electromagnet 45 on the right-hand wiping roller 2 attracts the right-hand push block 44 and is carried leftward, to further cause the electromagnet 45' on the left-hand wiping roller 2' to attract the left-hand push block 44'. Once the electromagnet 45' on the left-hand wiping roller 2' and the left-hand push block 44' have been attracted together, the direction control block 46 simultaneously touches the left-hand limit switch 36' causing the servo motor 41 to change its revolving direction. Therefore, the servo motor 41 is controlled to alternatively rotate clockwise and counter-clockwise, and the wiping rollers 2,2' are reciprocated over the windshield to wipe off rain, snow, etc.

Figure 4:
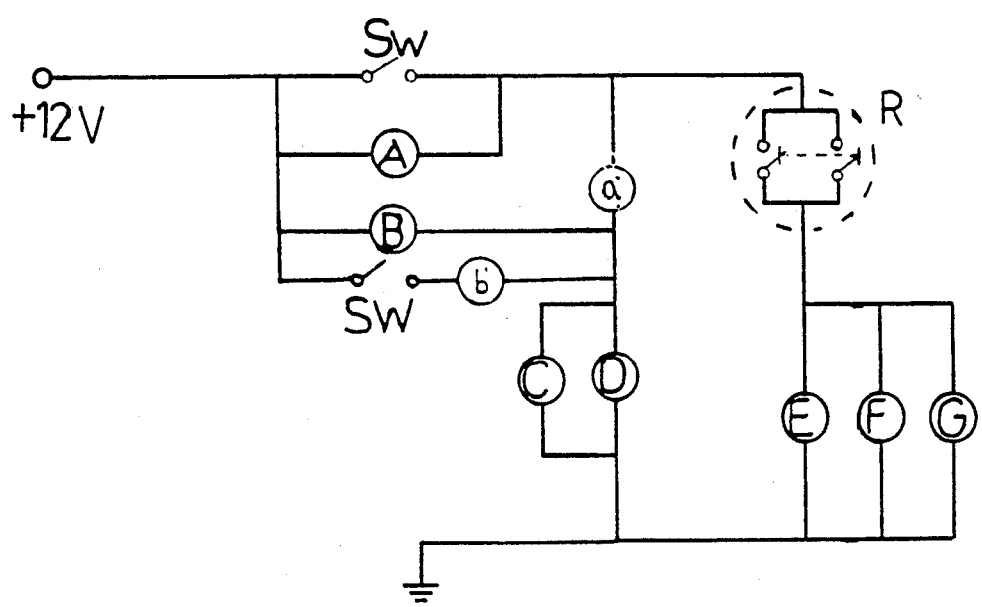
FIG. 4 is a circuit diagram according to the present invention.

Referring to FIG. 4 and FIG. 3 again, therein illustrated is a circuit diagram for the windshield wiper. The operation of the circuit is outlined hereinafter, where A and a' is the complimentary switch set of switch 34 and B and b' is the complimentary switch set of switch 34'. When the switch A or B is open, the corresponding switch a' or b' is closed and when switch A or B is closed, the corresponding switch a' or b' is open.

1) When the power switches SW and Sw are OFF, the electromagnetic switches 34,34' are respectively attracted by the wiping rollers 2,2', and therefore the switches A and B are open, while a' and b' are closed and the servo motor 41 does not work. In the diagram, G designates the servo motor 41; C designates the left-hand push block 44'; D designates the electromagnet 45' on the left-hand wiping roller 2'; E designates the right-hand push block 44; F designates the electromagnet 45 on the right-hand wiping roller 2; R designates the reversing circuit of the limit switches 36,36' which are not excited at this stage.

2) When the power switches SW and Sw are ON, electric power supply is connected through either limit switch 36 or 36' of the reversing circuit R to turn on the servo motor and simultaneously cause E and F, namely, the right-hand push block 44 and the electromagnet 45 on the right-hand wiping roller 2 to be excited and attracted together. At the same time, the electric power supply passes through the closed contact b' of the switch B causing C and D, namely, the left-hand push block 44' and the electromagnet 45' on the left-hand wiping roller 2' to be excited, as shown in FIG. 3A.

3) As the servo motor G continuously turns counter-clockwise, C and D approach one another and are attracted together thusly, the reversing circuit R drives the servo motor G to turn clockwise. Therefore, the servo motor G is controlled by the reversing circuit R to alternatively turn in reversed directions, as shown in FIGS. 3B and 3C.

4) Once the power switches SW and Sw are turned OFF, the rollers are parked automatically:
(a) If the wiping rollers are moved leftward and spaced from the switches 34 at the time of shut off, 34', the switches A and B are closed, electric power supply passes through the switches A and B to actuate C,D,E,F,G. As soon as the electromagnet 45' touches the switch 34' switch B goes open, C and D are released, thereby causing the wiping roller 2' to be stopped at the left side on the windshield, namely, at the reverse contact of the reversing circuit R. Therefore, the motor G turns in the reverse direction to carry the right-hand wiping roller to the right side for permitting the right-hand push block 44 to touch the right-hand electromagnetic switch 34 to open the switch A. As the switch A goes open, the element E,F, and G are stopped, the right-hand wiping roller is now returned to the right side on the windshield, as shown in FIG. 3E, and electric power supply is cut off.

(b) If the wiping rollers 2,2' are moved rightward, the right-hand push block 44 touches the right-hand electromagnetic switch 34 and switch A goes open. Since a1 is now closed, electric power supply passes from the closed switch B through the closed contact a1 to actuate the elements E, F and G. Elements C,D are still actuated via B. As the reversing circuit R is triggered, the servo motor G is driven to turn in the reversed direction. Switch A now goes closed again and operation continues as before with both rollers being driven. Shut off now can occur as in step (a) above.

What is claimed is:

1. A motor vehicle wiper for a windshield having a top, a bottom and opposed sides comprising:

a top rail fastened to a motor vehicle by two curved end plates and extending across the top of the windshield having a downward U-channel along its length;

a transmission gear assembly having an elongated rectangular frame and a rack fastened thereto extending across the bottom of the windshield;

two elongated wiping rollers movably fastened between said top rail and said transmission gear assembly, each wiping roller comprising a hollow tube covered with a rubber covering and revolvably sleeved on a steel axle, each wiping roller having one end coupled with a mobile bearing slidably mounted in said downward U-channel of said top rail and an opposite end coupled with a gear meshed with said rack and each said roller provided with an electromagnet on said opposite end;

a belt drive assembly having an endless belt mounted around two spaced apart belt rollers each rotatably fastened to said elongated rectangular frame at opposite ends thereof, said belt having upper and lower parallel sections, and a servo motor coupled to and driving said belt, two spaced metal blocks coupled to said belt on the upper section and a direction control block coupled to said belt on the lower section, the distance between said two spaced metal blocks being approximately equal to one third of the distance between said two belt rollers;

two electromagnetic switches mounted on opposite ends of said frame and electrically coupled with said servo motor and said electromagnets, said switches respectively controlled by said metal blocks of said belt drive assembly to trigger the electromagnet on either wiping roller to enable said wiping rollers to be respectively attracted to and thereby carried by said metal blocks to move said rollers over the windshield as said servo motor rotates; and two limit switches electrically coupled to said servo motor and fastened to said rack at opposite ends thereof, said switches alternatively triggered by said direction control block to change the revolving direction of said servo motor to provide leftward and rightward wiping of the windshield by the rollers.

* * * * *